(12) United States Patent
So

(10) Patent No.: US 9,402,410 B2
(45) Date of Patent: Aug. 2, 2016

(54) FOOD PROCESSING APPARATUS

(71) Applicant: Ki Mee Metal & Plastic Factory Limited, Hong Kong SAR (CN)

(72) Inventor: Shun So, Hong Kong (CN)

(73) Assignee: KI MEE METAL & PLASTIC FACTORY LIMITED, Hong Kong SAR (CN)

(*) Notice: Subject to any disclaimer, the term of this patent is extended or adjusted under 35 U.S.C. 154(b) by 422 days.

(21) Appl. No.: 14/027,461

(22) Filed: Sep. 16, 2013

(65) Prior Publication Data

US 2015/0075023 A1    Mar. 19, 2015

(51) Int. Cl.
| A47J 43/24 | (2006.01) |
| A23L 1/015 | (2006.01) |
| F26B 5/08 | (2006.01) |
| A47J 19/02 | (2006.01) |
| B04B 1/00 | (2006.01) |
| A23N 12/08 | (2006.01) |

(52) U.S. Cl.
CPC ............ *A23L 1/015* (2013.01); *A23N 12/086* (2013.01); *A47J 19/027* (2013.01); *A47J 43/24* (2013.01); *B04B 1/00* (2013.01); *F26B 5/08* (2013.01)

(58) Field of Classification Search
CPC ...... A47J 19/027; A47J 43/24; A23N 12/086; F26B 5/08; B04B 1/00
USPC ............... 99/495, 522, 511; 34/58, 127, 128; 210/360.1, 380.1, 368
See application file for complete search history.

(56) References Cited

U.S. PATENT DOCUMENTS

| 5,724,751 | A | 3/1998 | Ellingsen |
| 6,085,442 | A | 7/2000 | Erickson |
| 7,028,415 | B2 | 4/2006 | Heinzen et al. |
| 7,080,463 | B1 | 7/2006 | Johnson |
| 7,958,650 | B2 | 6/2011 | Turatti |
| 7,975,605 | B2 * | 7/2011 | Wan ........................ A47J 43/24 34/58 |
| 8,539,693 | B2 | 9/2013 | Perry et al. |
| 9,027,471 | B2 * | 5/2015 | Chan ...................... F16H 19/04 210/360.1 |
| 9,234,701 | B2 | 1/2016 | Wada et al. |
| 2006/0144257 | A1 | 7/2006 | Cheng et al. |
| 2007/0137504 | A1 | 6/2007 | Wan et al. |

(Continued)

FOREIGN PATENT DOCUMENTS

JP    2013-99587 A    5/2013

OTHER PUBLICATIONS

European Patent Office; Search Report in European Patent No. 14 27 5191; (Mar. 3, 2015).

*Primary Examiner* — Reginald L Alexander
(74) *Attorney, Agent, or Firm* — Leydig, Voit & Mayer, Ltd.

(57) ABSTRACT

A food processing apparatus has a housing, a basket supported in the housing for rotation about an axis of rotation, and a drive mechanism supported by the housing for rotating the basket to process food in the housing, for example, spinning off water from the food. The drive mechanism has a manual operating lever, a gearwheel rotated by the lever and coupled to the basket for rotating the basket, and a centrifugal clutch between the lever and the gearwheel for transmitting a rotational drive force from the lever to the gearwheel. The food processing apparatus includes a brake mechanism supported by the housing for braking rotation of the basket, the brake mechanism having a braking member frictionally engageable with the gearwheel to stop rotation of the basket.

23 Claims, 7 Drawing Sheets

(56) References Cited

U.S. PATENT DOCUMENTS

| | | |
|---|---|---|
| 2007/0180727 A1 | 8/2007 | Wan et al. |
| 2008/0188365 A1 | 8/2008 | Dalla Piazza et al. |
| 2008/0223226 A1 | 9/2008 | Holcomb et al. |
| 2008/0277513 A1 | 11/2008 | Holcomb et al. |
| 2009/0114104 A1* | 5/2009 | Sawhney ............ F26B 5/08 99/495 |
| 2010/0263555 A1* | 10/2010 | Mah .................. A47J 43/24 99/495 |
| 2013/0180414 A1 | 7/2013 | Chan et al. |
| 2014/0338546 A1* | 11/2014 | Repp ................. A47J 43/24 99/495 |

* cited by examiner

FOOD PROCESSING APPARATUS

The present invention relates to food processing apparatus that is manually operated and includes a brake to stop operation.

BACKGROUND OF INVENTION

Food processing apparatus such as food spinners are commonly in the kitchens for quickly spinning off water from food such as salad, vegetable or the like. Most of such spinners are hand-operated. A typical construction includes a bowl-shaped housing, a basket supported in the housing for rotation, and a drive mechanism for rotating the basket to spin off water from food in the basket. Whilst the drive mechanism should be designed to rotate the basket as fast as possible to spin off water quickly, the ability to stop the basket swiftly is another users' concern. It is known to provide a brake for this purpose, most of which seem to work, but there is room for improvement.

The invention seeks to provide a new or otherwise improved food processing apparatus.

SUMMARY OF THE INVENTION

According to the invention, there is provided food processing apparatus comprising a housing, a food processing device supported in the housing for rotation about an axis of rotation, and a drive mechanism supported by the housing for rotating the food processing device to process food in the housing. The drive mechanism comprises a manual operating member, a gearwheel arranged to be rotated by the manual operating member and in drive transmission with the food processing device for in turn rotating the food processing device, and a centrifugal clutch provided between the manual operating member and the gearwheel for transmitting rotational drive from the manual operating member to the gearwheel. The food processing apparatus includes a brake mechanism supported by the housing for braking the food processing device, the brake mechanism comprising a braking member frictionally engageable with the gearwheel to stop rotation of the food processing device.

Preferably, the manual operating member is supported for reciprocation in opposite directions, and the centrifugal clutch is adapted to hold and transmit rotational drive in one direction to the gearwheel and to slip in the opposite direction.

Preferably, the centrifugal clutch is in fixed engagement with the manual operating member for simultaneous motion and is in releasable engagement with the gearwheel.

More preferably, the centrifugal clutch comprises at least two keying members located between the manual operating member and the gearwheel, which are movable outwards by centrifugal action upon rotation of the centrifugal clutch to engage with the gearwheel. Each keying member is supported by a flexible link in a skewed direction such that the link is arranged to stay and hold the keying member in engagement with the gearwheel in a driving direction of the centrifugal clutch and to flex and disengage the keying member from the gearwheel in the opposite non-driving direction of the centrifugal clutch.

Further more preferably, each of the flexible links extends from a central hub of the centrifugal clutch along a spiral path which terminates in the said skewed direction at the associated keying member.

Yet further more preferably, the centrifugal clutch includes eight said keying members at equiangular positions about the hub.

In a preferred embodiment, the keying members are provided by respective parallel rods in a cylindrical arrangement, with the rods extending axially of the cylindrical arrangement and the links lying on an imaginary plane at one end of the cylindrical arrangement.

More preferably, the centrifugal clutch is disposed co-axially on a generally cylindrical former which is connected to the manual operating member, the former having parallel channels which locate the rods respectively in a loose manner.

Further more preferably, each channel has a relatively shallower side for holding the respective rod outward in engagement with the gearwheel and a relatively deeper side to give room allowing the rod to disengage from the gearwheel.

In a preferred embodiment, the gearwheel has an outer periphery bearing gear teeth and an inner periphery bearing recesses for engagement by the keying members.

More preferably, the recesses are provided by grooves which are generally as long as the keying members.

Further more preferably, the gearwheel includes an inner collar having a cylindrical inner surface on which the grooves are formed.

It is preferred that the drive mechanism includes a train of gears for transmitting rotational drive from the centrifugal clutch to the food processing device, which has the gearwheel as the first gear in the train and includes at least one other gearwheel as the last gear in drive engagement with the food processing device for rotating the food processing device.

In a preferred embodiment, the brake mechanism includes a hollow brake body which is attached to the housing and carries the braking member.

More preferably, the brake body encloses a part of the gearwheel.

Further more preferably, the gearwheel is located partially in a recess in the housing, and the brake body closes the recess while enclosing the part of the gearwheel.

Yet further more preferably, the brake body is of a shape generally matching the outline of the part of the gearwheel, thereby bringing the braking member in close proximity to the gearwheel.

In a preferred embodiment, the braking member is provided by a portion of a wall of the brake body, which is partially cut to form a tab that only remains connected at a small part such that the tab can be pressed inward from outside against the gearwheel.

More preferably, the tab is thickened outwards to form a knob.

Advantageously, the gearwheel is provided with a friction member for enhanced frictional grip by the braking member.

In a preferred embodiment, the drive mechanism includes a pair of said gearwheels which are arranged to be rotated by the manual operating member in opposite directions respectively and are in drive transmission with the food processing device, with a corresponding said centrifugal clutch provided between the manual operating member and each gearwheel for transmitting rotational drive from the manual operating member to the corresponding gearwheel in the respective direction. The drive mechanism further includes a common gear in drive engagement between both gearwheels and the food processing device for rotating the food processing device, with rotational drive in opposite directions received from the gearwheels being in operation merged by the common gear into a unidirectional rotational drive for rotating the food processing device.

More preferably, the two centrifugal clutches have the same construction but are arranged in opposite directions for clutching actions in opposite directions.

More preferably, the brake mechanism includes a pair of said braking members frictionally engageable with the gearwheels respectively to stop rotation of the food processing device.

Further more preferably, the two braking members are arranged on opposite sides for pressing in opposite directions into frictional engagement with the gearwheels.

In a preferred embodiment, the food processing apparatus is a food spinner for spinning off water from food contained in the food processing device which comprises a perforated container.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
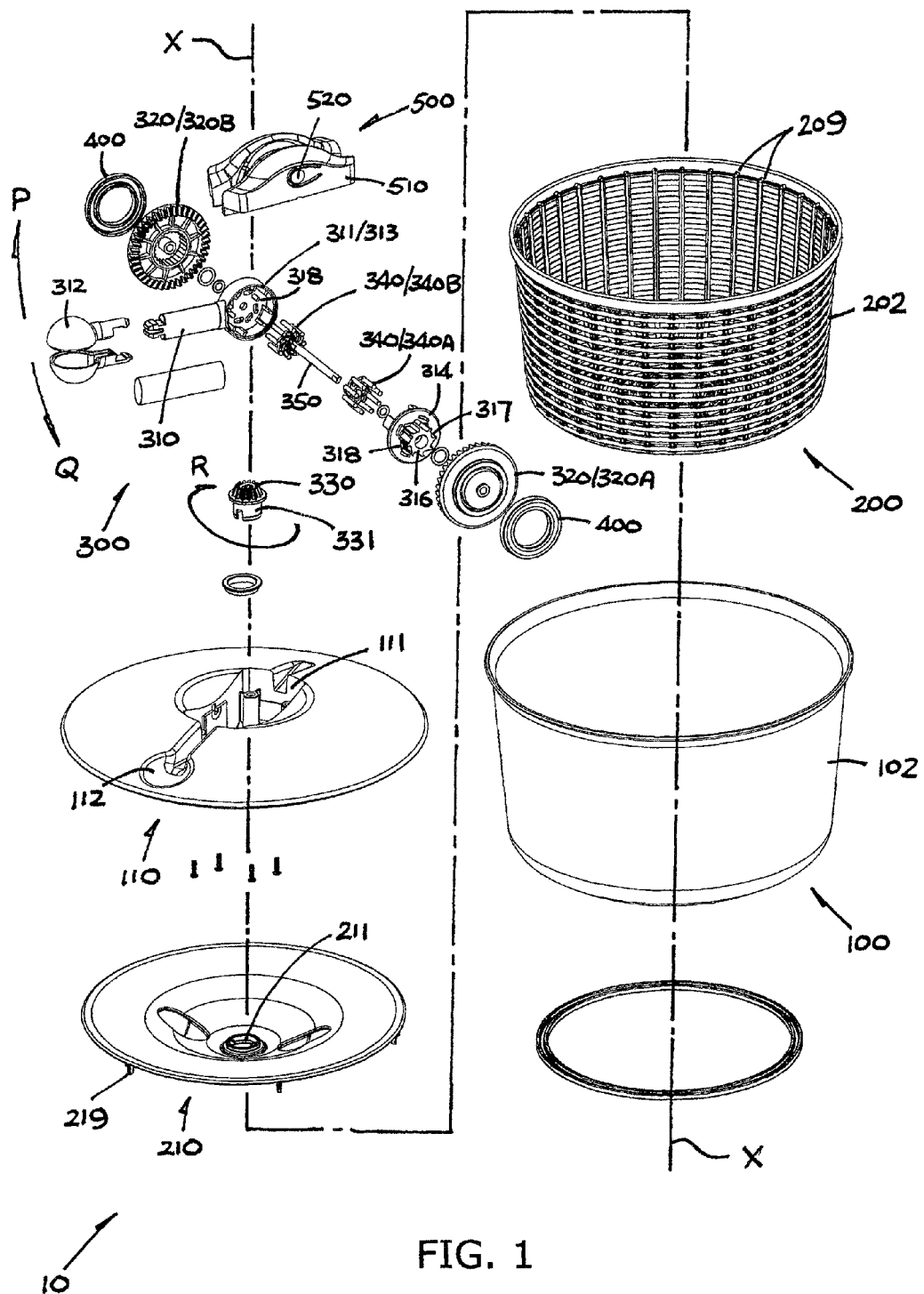
FIG. 1 is an exploded perspective view of an embodiment of food processing apparatus in accordance with the invention.
Figure 2:
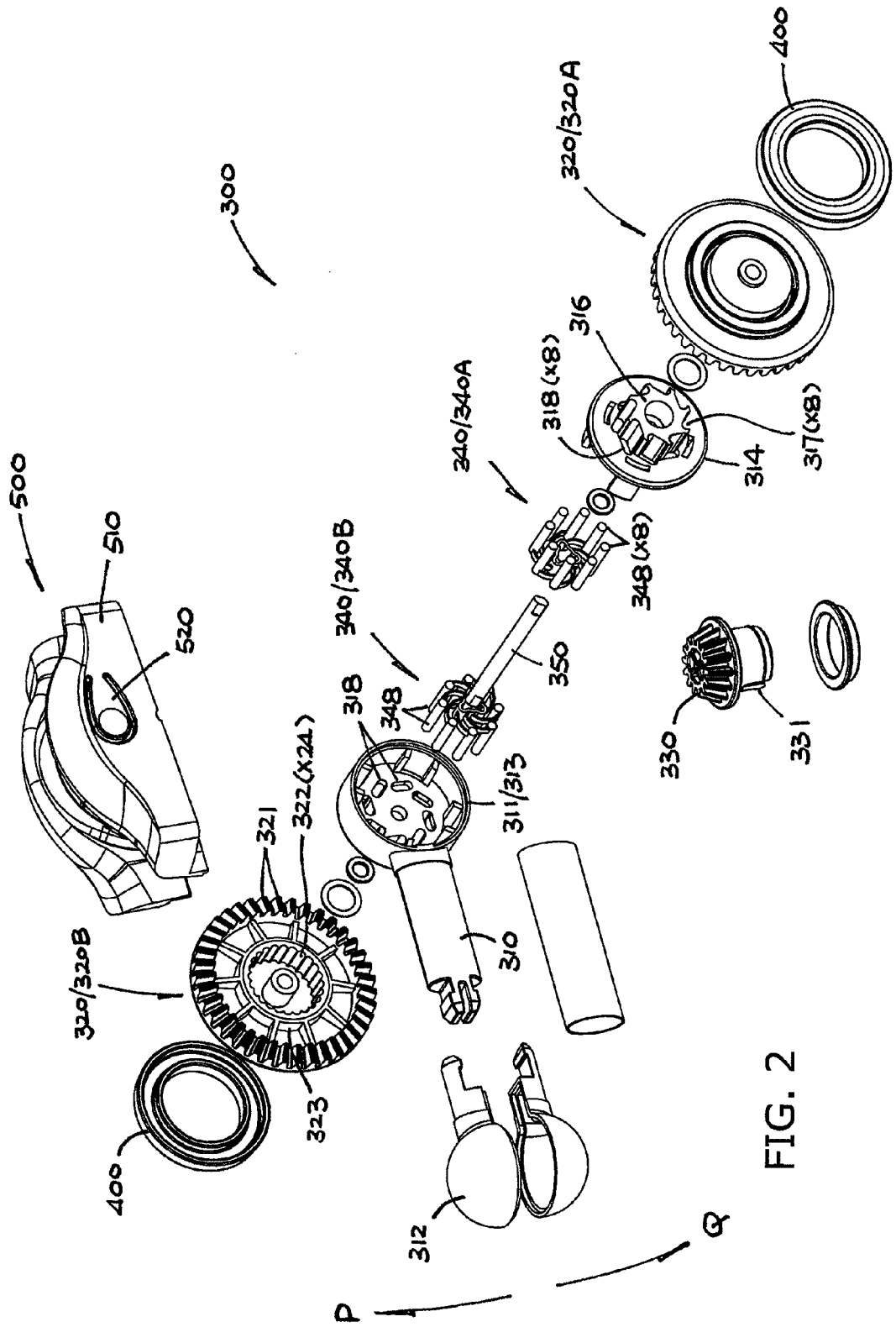
FIG. 2 is another exploded perspective view showing a drive mechanism of the food processing apparatus of FIG. 1.

Referring to FIGS. 1 to 8B of the drawings, there is shown food processing apparatus embodying the invention, which is in the form of, for example, a salad spinner 10 for salad or vegetable, etc. The salad spinner 10 includes a generally cylindrical housing 100 having a round top cover 110, a generally cylindrical basket 200 located in the housing 100 and supported for rotation about a common vertical central axis X, and a drive mechanism 300 supported by the cover 110 for rotating the basket 200 so as to spin off water from salad or vegetable contained in the basket 200.

There is also a brake mechanism 500 which is supported by the housing 100, and partially located in a recessed central region or central recess 111 of the housing cover 110, for braking the basket 200 to stop rotation of the basket 200.

The basket 200, being in general a perforated container, is an example of a food processing device for rotation to process food in the housing 100, that is in this particular embodiment separating water from salad or the like. The basket 200 is normally closed by its own round lid 210 which couples the basket 200 to be in drive engagement with the drive mechanism 300 for rotation thereby.

The housing 100 has a round bottom 101 and a cylindrical side wall 102 on the bottom 101, with a central spike 105 projecting upwardly from the bottom 101. Similarly but slightly smaller in size, the basket 200 has a round bottom 201 and a cylindrical side wall 202 upstanding integrally therefrom. The basket bottom 201 has a central dent 205 which faces downwards and bears upon the spike 105, such that the basket 200 is rotatable about the central axis X. The basket 200 with lid 210 is slightly smaller than the interior of the housing 100 with cover 110, and fits loosely therein.

The lid 210 and the basket 200 are coupled together for simultaneous rotation through angular inter-engagement between peripheral lugs 219 on lid's lower surface and reinforcement ribs 209 on the basket's inner surface, such that the basket 200 and lid 210 will rotate and stop at the same time.

The housing cover 110 is convex upwardly and the basket lid 210 concave downwardly, together forming between them a circular central cavity in which the drive mechanism 300 is located.

The drive mechanism 300 is formed by a manual operating member 310, and a set of gears having a pair of gearwheels 320A and 320B and a third, common gear 330 arranged to be rotated by the manual operating member 310 and in drive transmission with the basket 200 for in turn rotating the basket 200. The drive mechanism 300 includes a pair of centrifugal clutches 340A and 340B provided between the manual operating member 310 and the gearwheels 320A and 320B respectively for transmitting rotational drive from the manual operating member 310 to the gearwheels 320A and 320B. In passing, the brake mechanism 500 incorporates a pair of braking members 520 which are frictionally engageable with the gearwheels 320A and 320B respectively to stop rotation of the basket 200, as will be described later.

Figure 5:
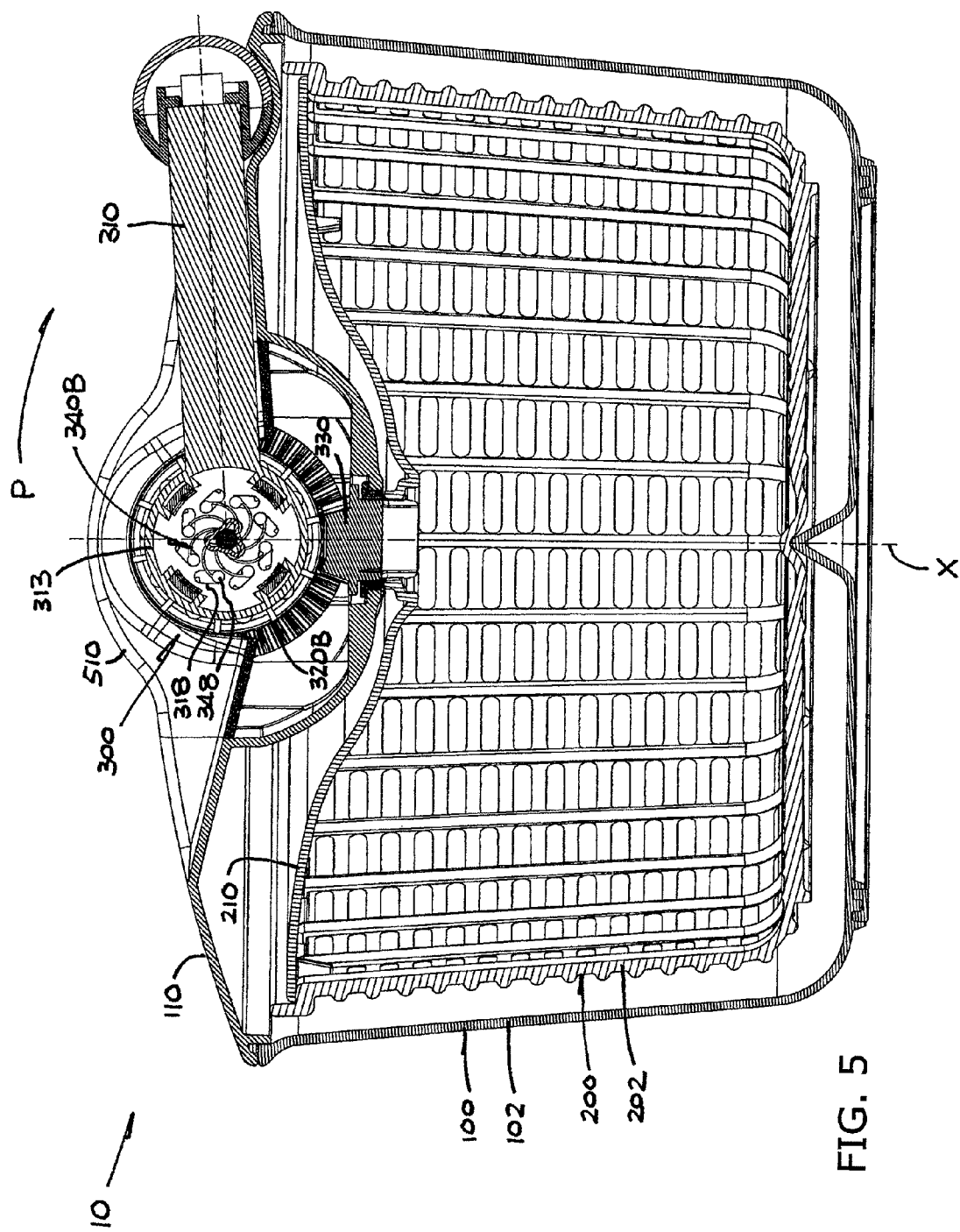
FIG. 5 is a cross-sectional side view corresponding to FIG. 4, showing the drive mechanism in part in non-driving operation.
Figure 6:
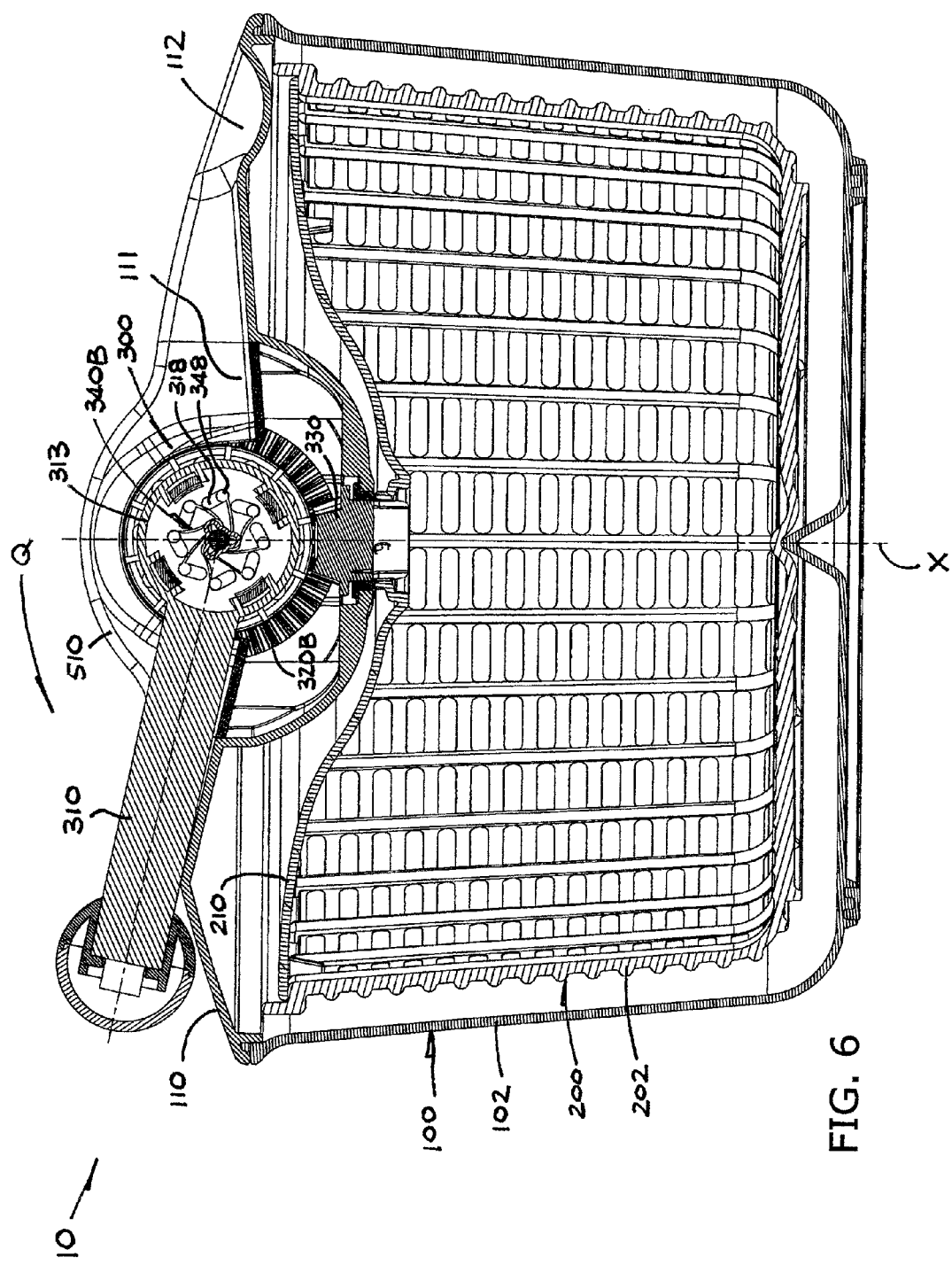
FIG. 6 is another cross-sectional side view equivalent to FIG. 5, showing the drive mechanism in part in driving operation.

The manual operating member 310 is implemented by a reciprocating lever 310 which has an inner end 311 pivotably connected in the central recess 111 of the housing cover 110 by means of a horizontal axle 350 that extends across the top of the central recess 111, with the outer end 312 being free and in the form of a knob for manipulation. The operating lever 310 is pivotable in opposite directions P and Q (FIGS. 1 and 2) between the left and right sides on the cover 110 (cf FIGS. 5 and 6) through an angle of about 160° for operating the drive mechanism 300. The cover 110 is formed with an oblong recess 112 is an extension of the central recess 111 and shaped to match the lever 310, fully into which recess 112 the lever 310 may be pivoted for storage (FIG. 5).

The inner end 311 of the lever 310 is expanded to form a two-part flat cylindrical box 313 that is disposed co-axially about the axle 350 for pivotal motion. The box 313 has two opposite flat circular end walls 314, through each of which eight identical slots 318 are formed. The slots 318 on each end wall 314 are arranged evenly in a circle about the wall's centre, and are inclined or skewed at a small angle of about 20° from the circle in the clockwise direction on one end wall 314 and in the anti-clockwise direction on the opposite end wall 314.

Each end wall 314 bears a generally cylindrical hollow former 316 which projects co-axially outwardly from the end wall 314, having a cross-section within and surrounded by the circle of slots 318. On and around its cylindrical surface, the former 316 is shaped to provide eight parallel channels 317 at equiangular positions.

Both gearwheels 320A and 320B, or collectively 320, are bevel gearwheels of identical construction (FIG. 2), each having an outer periphery bearing a ring of gear teeth 321 and an inner periphery bearing a ring of recesses 322. The recesses 322 have an identical arcuate cross-section and are provided by evenly-distributed uniform grooves 322 on and around a cylindrical inner surface of an inner collar 323 which is formed co-axially and integrally on the gear teeth's side of the gearwheel 320. There are twenty-four such grooves 322 and they extend parallel to the axial direction of the gearwheel 320. The opposite side of the gearwheel 320 is generally flat, to which there is co-axially attached a friction member in the form of, for example, a ring 400 which may be made of rubber or the like for enhanced frictional grip by the respective braking member 520. The ring 400 is optional but advantageous. The common gear 330 is also a bevel gear, but is much smaller than the first two gearwheels 320.

The centrifugal clutches 340A and 340B, or collectively 340, have the same construction. Each centrifugal clutch 340 is formed by a central hub 341 and eight (i.e. at least two) identical claws or keying members 348 which are connected by respective identical flexible links 349 to the hub 341 in an equiangular manner about the hub 341. Each of the flexible links 349 extends from the hub 341 along a spiral path that terminates in a skewed direction or angle at the associated keying member 348, in which direction or at which angle the associated keying member 348 is supported.

Figure 3A:
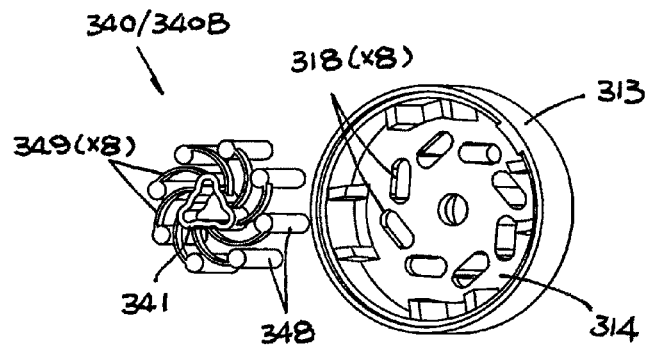
FIGS. 3A to 3C are further exploded perspective views showing parts of the drive mechanism of FIG. 2.
Figure 3B:
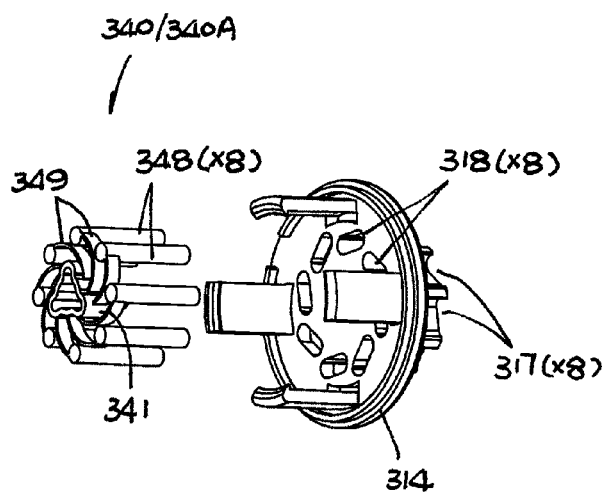
Figure 3C:
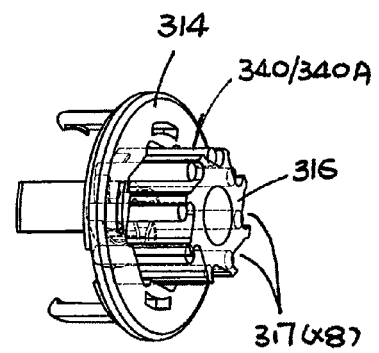
Figure 4:
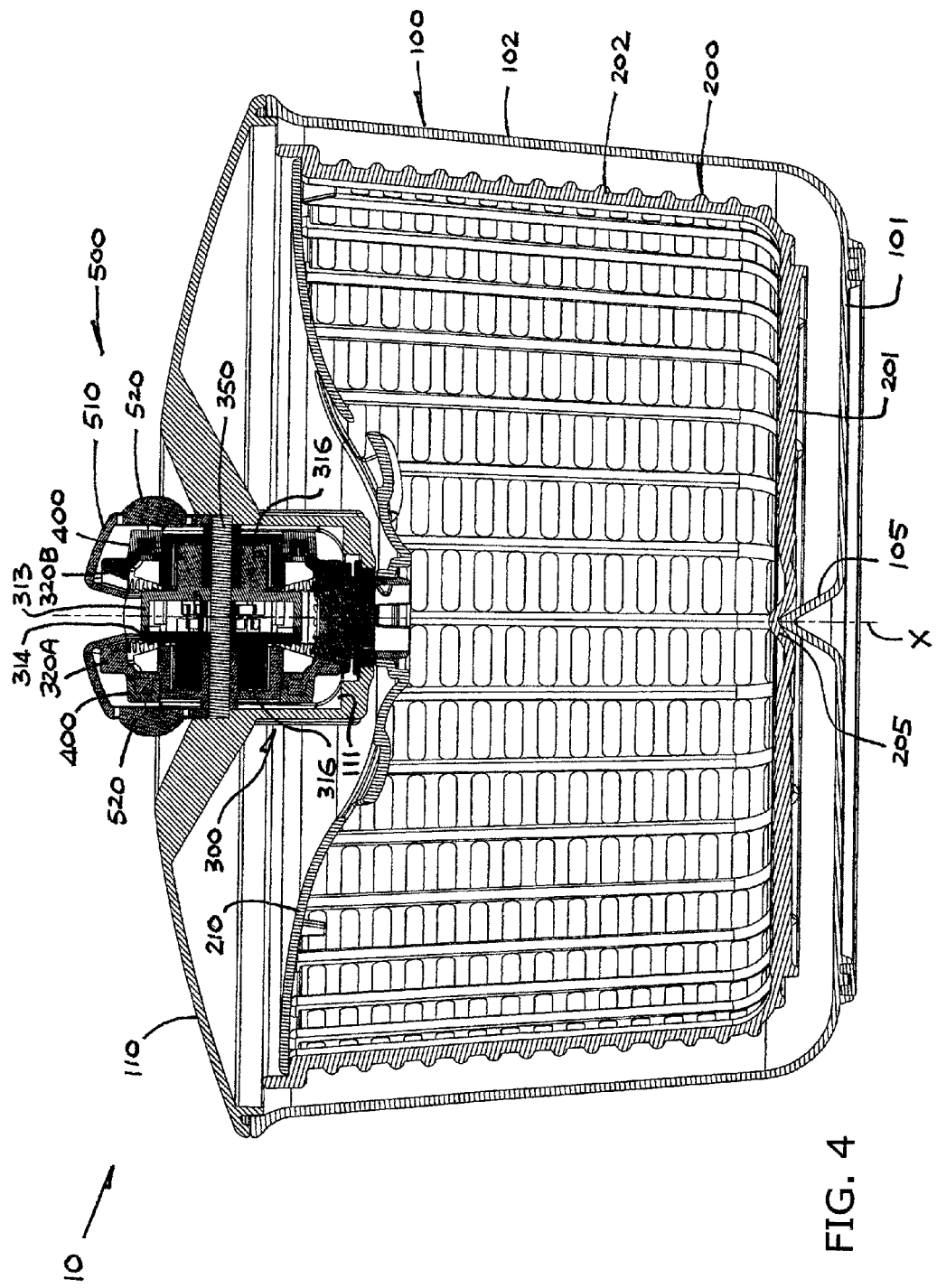
FIG. 4 is a cross-sectional side view of the food processing apparatus of FIG. 1, now assembled.

The keying members 348 are provided by co-parallel rods 348, each of a circular cross-section, in a cylindrical arrangement, with the rods 348 extending axially of the cylindrical arrangement and the links 349 lying on an imaginary plane at one end of the cylindrical arrangement (FIGS. 3A to 3C).

The two centrifugal clutches 340A and 340B are arranged in opposite directions by, in this embodiment, being located in a back-to-back arrangement inside the lever's end box 313, each with its eight keying rods 348 projecting through the slots 318 individually out from the box's relevant end wall 314 and then lying in the channels 317 of the former 316 respectively. Thus, each centrifugal clutch 340A/340B is disposed co-axially on the respective former 316, with the former's channels 317 locating the latter's rods 348 respectively in a loose manner.

For each centrifugal clutch 340 and associated former 316, the channels 317 have a relatively shallower side 317S in the spiral direction of the links 349 for holding the corresponding rods 348 partially outwards (and in engagement with the gearwheel 320) and a relatively deeper side 317D to give room allowing the rods 348 to recede completely into the channels 317 (and disengage from the gearwheel 320).

By being located in and projecting out of the lever's end box 313, both centrifugal clutches 340A and 340B are in fixed engagement with the lever 310 for simultaneous motion such that they will turn with the lever 310 as one piece in the same direction either way upon pivoting of the lever 310 during the operation of the drive mechanism 300.

While the lever 310 is hinged with its end box 313 about the axle 350 for pivotal motion, both centrifugal clutches 340A and 340B are similarly disposed on the axle 350 for turning, facing in opposite directions. The two gearwheels 320A and 320B are also disposed on the axle 350 for turning, right next to and in engagement with the centrifugal clutches 340A and 340B respectively. Each centrifugal clutch 340A/340B is inserted into the collar 323 of the associated gearwheel 320A/320B for clutching action with the collar's grooves 322 to transmit rotational drive from the lever 310 and to the gearwheel 320A/320B.

A clutching action occurs each time upon pivoting of the lever 310 in either direction, but is only performed by one of the centrifugal clutches 340A and 340B which is turned in the driving direction and hence connects, with the other centrifugal clutch 340B/340A slipping or disconnecting in the non-driving direction. The centrifugal clutches 340A and 340B are therefore in releasable engagement with the respective gearwheels 320A and 320B for drive transmission.

As the centrifugal clutches 340A and 340B are turned by the lever 310, each of them will expand with its rods 348 swinging radially outwards under centrifugal action, through flexing of the associated links 349. When the centrifugal clutches 340A and 340B stop turning with the lever 310, they will contract as the links 349 connecting their rods 348 flex back inwards by virtue of the links' own resilience.

Taking the centrifugal clutch 340B turning in the spiral direction of its links 349 (i.e. in direction Q) as an example (FIGS. 6, 8A and 8B), it expands to have its rods 348 swung outwards into engagement with respective adjacent grooves 322 of the associated gearwheel 320B. The rods 348 are displaced to reach the shallower sides 317S in their associated channels 317 on the former 316, where they are held about halfway outwards in engagement with the respective grooves 322 and hence the overall gearwheel 320B, in a keying action. The centrifugal clutch 340B connects. The gearwheel 320B is therefore driven to turn in the driving direction Q, and will continue to be turned until the lever 310 later stops and/or is reversed in direction P.

Figure 7A:
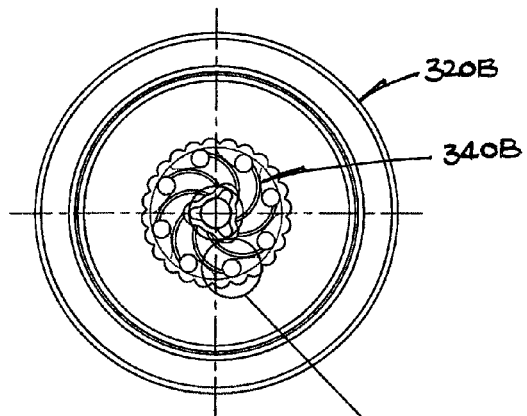
FIGS. 7A and 7B are enlarged sides views illustrating the non-driving operation of FIG. 5.
Figure 7B:
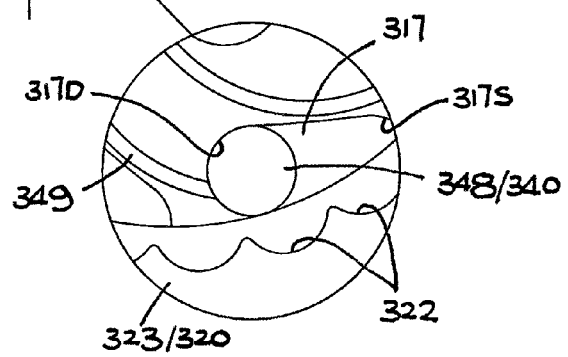
Figure 8A:
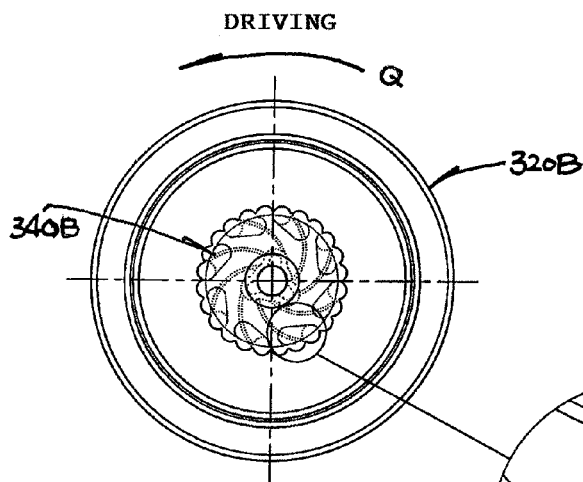
FIGS. 8A and 8B are enlarged side views illustrating the driving operation of FIG. 6.
Figure 8B:
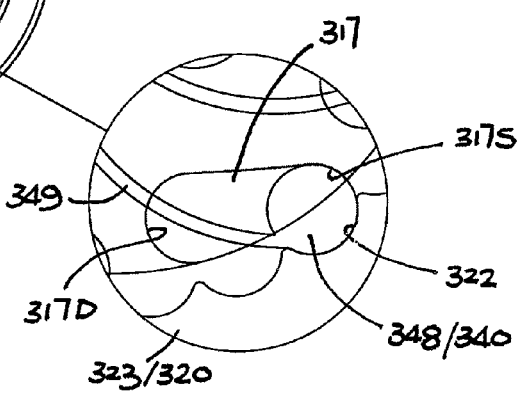

At such later time, the rods 348 will be displaced (by resilience and/or through reversed motion) to reach the opposite deeper sides 317D in their associated channels 317, which give room allowing the rods 348 to recede completely into the channels 317 and disengage from the respective grooves 322 (FIGS. 5, 7A and 7B). Thus the centrifugal clutch 340B disconnects and slips in the non-driving direction P, and the gearwheel 320B stops.

The other centrifugal clutch 340A operates in the opposite direction P, performing a clutching action in generally the same manner as described above.

In general, the rods 348 of each centrifugal clutch 340 are supported by respective flexible links 349 in a skewed (e.g. spiral) direction such that the links 349 are arranged to stay and hold the rods 348 in engagement with the associated gearwheel 320 in a driving direction of the centrifugal clutch 340 in line with the skewed direction, and to flex back and disengage the rods 348 from the gearwheel 320 in the opposite non-driving direction of the centrifugal clutch 340, countering the skewed direction.

Because the two centrifugal clutches 340A and 340B are arranged back-to-back, their links 349 extend in opposite spiral directions, with the result that they operate in opposite directions i.e. one connecting while the other disconnecting at any time during the operation of the drive mechanism 300. Overall, the gearwheel 320A will be driven by the lever 310 pivoting in direction P, and the other gearwheel 320B instead will be driven by the lever 310 pivoting in the reversed direction Q. Upon reciprocation of the lever 310, the two gearwheels 320A and 320B will rotate in turn or alternately and in opposite directions.

The common gear 330 is supported horizontally for rotation about the vertical axis X at a position right below and between the two gearwheels 320A and 320B, being in mesh with them at right angles on opposite sides to receive rotational drive from them on opposite sides. The common gear 330 has a co-axially depending plug 331 which is releasably coupled with a central socket hole 211 of the basket's lid 210 for rotating the basket 200. Overall, the common gear 300 is in drive engagement between both gearwheels 320A and 320B and the basket 200 for rotating the basket 200.

As the common gear 330 has its opposite left and right sides in mesh with the gearwheels 320A and 320B respectively, the rotational drive in opposite directions received from the gearwheels 320A and 320B is in operation combined or merged by the common gear 330 into a unidirectional rotational drive, i.e. in single direction R (FIG. 1), for rotating the basket 200 via its lid 210.

The gearwheel 320A and the common gear 330 constitute a train of gears, and the other gearwheel 320B and the common gear 330 constitute a second train of gears running in parallel with the first train, for alternately transmitting rotational drive from the respective centrifugal clutches 340A and 340B to the basket 200. The gearwheel 320A/320B acts as the first gear in each train, and the common gear 330 is included acting as the last gear in drive engagement with the basket 200 for rotating the basket 200.

The gearwheels 320A and 320B are at an upstream position in the drive transmission path relative to the load i.e. basket 200. It is found that braking applied at such an upstream position is particularly effective, at least more effective than that applied to the load i.e. the basket 200 or its lid 210. Being the first gear in the gear trains transmitting drive, the gearwheel 320A/320B is closest to the source of drive, and this arrangement further enhances the braking efficacy.

It is noted that the unidirectional drive rotating the basket 20 is transmitted from the two gearwheels 320A and 320B alternately in an intermittent manner as the lever 310 is reversed at each of its leftmost and rightmost end positions. However, during reversal of the lever 310, the basket 200 especially when it is loaded with content will continue to rotate by inertia or momentum i.e. to freewheel without significant obstruction, only other than friction in the rotating system, because both centrifugal clutches 340A and 340B will momentarily disconnect each time when the lever 310 reverses.

Referring now to the brake mechanism 500, it has a brake body 510 which is hollow and whose wall carries the aforesaid pair of braking members 520 on opposite sides thereof. The brake body 510 is located on and attached to the housing cover 110 and extending across the top of the central recess 111 to cover or close the central recess 111. The brake body 510 is of a shape, resembling a snail's shell, generally matching the outline of the upper half of the two gearwheels 320A and 320B for enclosing and embracing the same, which protrudes upwardly out of the central recess 111, thereby concealing the otherwise exposed part of the drive mechanism 300 from sight, which is not intended for user's access.

The matching of shape brings the braking members 520 adjacent the gearwheels 320A and 320B respectively and on opposite sides thereof, in close proximity to but spaced slightly apart from the respective friction rings 400 thereon, for frictional engagement therewith. Each braking member 520 is provided by a portion of the wall of the brake body 510, which is partially cut to form a round or oblong tab that only remains connected at a small part, e.g. one end, such that the tab, i.e. braking member 520, can be pressed inward from outside against the respective friction ring 400. Upon release, the tabs will self return or disengage under own resilience. Each tab is thickened outwards to form a knob for convenience of pressing.

The parallel or side-by-side arrangement of the two gearwheels 320A and 320B with their friction rings 400 on the outside further facilitates manual operation. The user only needs to pinch or squeeze the two knobs on opposite sides with his/her index finger and thumb to press both braking members 520 in opposite directions into frictional engagement with the gearwheels 320A and 320B i.e. against the corresponding friction rings 400 to stop rotation of the gearwheels 320A and 320B and in turn the basket 200.

The centrifugal clutches 320 described above have the advantages of being simple in construction and light in weight. Although centrifugal clutch is an essential feature of the present invention, its specific form is subject to change and/or modification. It is therefore envisaged that any other suitable forms of centrifugal clutches may be employed.

It is noted that the centrifugal clutch of the invention is a mechanical device that allows movement in only one direction, and may be referred to as a ratchet generally or at least for the purpose of the present invention.

Although the invention is applicable to a food or salad spinner as in the described embodiment, it is envisaged that other food processing apparatus, such as food mixers (e.g. salad dressing mixer) and food grinders, may employ the invention.

The invention has been given by way of example only, and various other modifications of and/or alterations to the described embodiment may be made by persons skilled in the art without departing from the scope of the invention as specified in the appended claims.

The invention claimed is:

1. A food processing apparatus comprising:
   a housing;
   a food processing device supported in the housing for rotation about an axis of rotation;
   a drive mechanism supported by the housing for rotating the food processing device to process food in the housing, wherein the drive mechanism includes
      a manual operating member,
      a gearwheel arranged to be rotated by the manual operating member and coupled to the food processing device for, in turn, rotating the food processing device, and
      a centrifugal clutch located between the manual operating member and the gearwheel for transmitting a rotational drive force from the manual operating member to the gearwheel, wherein
         the centrifugal clutch is in fixed engagement with the manual operating member for simultaneous motion of the manual operating member and the centrifugal clutch, and is in releasable engagement with the gearwheel,
         the centrifugal clutch comprises at least two keying members located between the manual operating member and the gearwheel,
         the at least two keying members are movable outwards by centrifugal action upon rotation of the centrifugal clutch and engagement with the gearwheel, and
         each keying member is supported by a flexible link in a skewed direction such that the flexible link stays and holds the keying member in engagement with the gearwheel in a driving direction of the centrifugal clutch and flexes and disengages the keying member from the gearwheel in a non-driving direction, opposite the driving direction, of the centrifugal clutch; and
   a brake mechanism supported by the housing for braking the food processing device, the brake mechanism comprising a braking member frictionally engageable with the gearwheel for stopping rotation of the food processing device.

2. The food processing apparatus as claimed in claim 1, wherein
   the manual operating member is supported for reciprocation in opposite directions, and
   the centrifugal clutch selectively withholds and transmits the rotational drive force in a first direction to the gearwheel and slips in a second direction that is opposite the first direction.

3. The food processing apparatus as claimed in claim 1, wherein each of the flexible links extends from a central hub of the centrifugal clutch along a spiral path which terminates in the skewed direction at the keying member associated with the flexible link.

4. The food processing apparatus as claimed in claim 3, wherein the centrifugal clutch includes eight keying members at equiangular positions about the central hub.

5. The food processing apparatus as claimed in claim 1, wherein the keying members include respective parallel rods positioned in a cylindrical arrangement, with the rods extending axially in the cylindrical arrangement and the flexible links lying on an imaginary plane at one end of the cylindrical arrangement.

6. The food processing apparatus as claimed in claim 5, including a generally cylindrical former which is connected to the manual operating member, wherein
the centrifugal clutch is disposed coaxially with and on the generally cylindrical former, and
the generally cylindrical former has parallel channels which locate the respective rods in a loose manner.

7. The food processing apparatus as claimed in claim 6, wherein each channel has a relatively shallower side for holding a respective rod outward in engagement with the gearwheel and a relatively deeper side allowing the rod to disengage from the gearwheel.

8. The food processing apparatus as claimed in claim 1, wherein the gearwheel has an outer periphery with gear teeth and an inner periphery with recesses for engagement by the keying members.

9. The food processing apparatus as claimed in claim 8, wherein the recesses are grooves which are generally as long as the keying members.

10. The food processing apparatus as claimed in claim 9, wherein the gearwheel includes an inner collar having a cylindrical inner surface on which the grooves are located.

11. A food processing apparatus comprising:
a housing;
a food processing device supported in the housing for rotation about an axis of rotation;
a drive mechanism supported by the housing for rotating the food processing device to process food in the housing, the drive mechanism includes
a manual operating member,
a gearwheel arranged to be rotated by the manual operating member and coupled to the food processing device for, in turn, rotating the food processing device,
a centrifugal clutch located between the manual operating member and the gearwheel for transmitting a rotational drive force from the manual operating member to the gearwheel;
a train of gears for transmitting the rotational drive force from the centrifugal clutch to the food processing device,
the gearwheel is a first gear in the train of gears, and
the train of gears includes at least one other gearwheel, as a last gear in the train of gears and that engages the food processing device for rotating the food processing device; and
a brake mechanism supported by the housing for braking the food processing device, the brake mechanism comprising a braking member frictionally engageable with the gearwheel for stopping rotation of the food processing device.

12. The food processing apparatus as claimed in claim 11, wherein the brake mechanism includes a hollow brake body which is attached to the housing and carries the braking member.

13. The food processing apparatus as claimed in claim 12, wherein the brake body encloses only a part of the gearwheel.

14. The food processing apparatus as claimed in claim 13, wherein
the gearwheel is located partially in a recess in the housing, and
the brake body closes the recess and the part of the gearwheel.

15. The food processing apparatus as claimed in claim 14, wherein
the brake body has a shape generally matching an outline of the part of the gearwheel, and
the braking member is in close proximity to the gearwheel.

16. The food processing apparatus as claimed in claim 11, being a food spinner for spinning water from food contained in the food processing device, wherein the food processing device comprises a perforated container.

17. A food processing apparatus comprising:
a housing;
a food processing device supported in the housing for rotation about an axis of rotation;
a drive mechanism supported by the housing for rotating the food processing device to process food in the housing, wherein the drive mechanism includes
a manual operating member,
a gearwheel arranged to be rotated by the manual operating member and coupled to the food processing device for, in turn, rotating the food processing device, and
a centrifugal clutch located between the manual operating member and the gearwheel for transmitting a rotational drive force from the manual operating member to the gearwheel; and
a brake mechanism supported by the housing for braking the food processing device, the brake mechanism comprising a braking member frictionally engageable with the gearwheel for stopping rotation of the food processing device, wherein
the brake mechanism includes a hollow brake body which is attached to the housing and carries the braking member,
the braking member includes a portion of a wall of the brake body, and
the wall is partially cut to form a tab that can be pressed inward from outside, against the gearwheel.

18. The food processing apparatus as claimed in claim 17, wherein the tab is thickened outwards to form a knob.

19. The food processing apparatus as claimed in claim 17, wherein the gearwheel includes a friction member for frictionally gripping by the braking member.

20. A food processing apparatus comprising;
a housing;
a food processing device supported in the housing for rotation about an axis of rotation;
a drive mechanism supported by the housing for rotating the food processing device to process food in the housing, wherein the drive mechanism includes
a manual operating member,
a gearwheel arranged to be rotated by the manual operating member and coupled to the food processing device for, in turn, rotating the food processing device, a centrifugal clutch located between the manual operating member and the gearwheel for transmitting a rotational drive force from the manual operating member to the gearwheel, two gearwheels rotated by the manual operating member in opposite directions and coupled to the food processing device, two centrifugal clutches with a respective centrifugal clutch located between the manual operating member and each of the two gearwheels for transmitting the rotational drive force from the manual operating member to the respective gearwheel in the respective direction, and a common gear in engagement with both of the two gearwheels and the food processing device for rotating the food processing device in response to the rotational drive force received from the two gearwheels through the common gear for rotating the food processing device; and a brake mechanism supported by the housing for braking the food processing device, the brake mechanism comprising a braking member frictionally engageable with the gearwheel for stopping rotation of the food processing device.

21. The food processing apparatus as claimed in claim 20, wherein the two centrifugal clutches have the same construction and are arranged for clutching actions in opposite directions.

22. The food processing apparatus as claimed in claim 20, wherein the brake mechanism includes two braking members frictionally engageable with the two gearwheels, respectively, for stopping rotation of the food processing device.

23. The food processing apparatus as claimed in claim 22, wherein the two braking members are arranged on opposite sides of the two gearwheels for pressing in opposite directions into frictional engagement with the two gearwheels.

* * * * *